US011387728B2

(12) United States Patent
Kim

(10) Patent No.: US 11,387,728 B2
(45) Date of Patent: Jul. 12, 2022

(54) LINEAR MOTOR AND TRANSPORT SYSTEM USING THE SAME

(71) Applicants: KOVERY CO., LTD., Hwaseong-si (KR); Houng Joong Kim, Incheon (KR)

(72) Inventor: Houng Joong Kim, Incheon (KR)

(73) Assignees: KOVERY CO., LTD., Hwaseong-si (KR); Houng Joong Kim, Incheon (KR)

( * ) Notice: Subject to any disclaimer, the term of this patent is extended or adjusted under 35 U.S.C. 154(b) by 0 days.

(21) Appl. No.: 17/090,527

(22) Filed: Nov. 5, 2020

(65) Prior Publication Data
US 2021/0135558 A1 May 6, 2021

(30) Foreign Application Priority Data

Nov. 6, 2019 (KR) .................. 10-2019-0140740

(51) Int. Cl.
*H02K 41/03* (2006.01)
*H02K 21/02* (2006.01)
*H02K 1/06* (2006.01)

(52) U.S. Cl.
CPC ............. *H02K 41/031* (2013.01); *H02K 1/06* (2013.01); *H02K 21/02* (2013.01); *H02K 2201/06* (2013.01)

(58) Field of Classification Search
CPC .......... H02K 41/03; H02K 1/06; H02K 21/02; H02K 41/031; H02K 2201/06
See application file for complete search history.

(56) References Cited

U.S. PATENT DOCUMENTS

| 2012/0062046 | A1* | 3/2012 | Hoshi | H02K 41/031 |
| | | | | 310/12.15 |
| 2013/0154398 | A1 | 6/2013 | Kim | |
| 2015/0035388 | A1* | 2/2015 | Mita | H02K 41/033 |
| | | | | 310/12.18 |
| 2015/0222167 | A1* | 8/2015 | Aoyama | H02K 41/031 |
| | | | | 310/12.18 |

FOREIGN PATENT DOCUMENTS

| CN | 104011976 A | 8/2014 |
| CN | 107155395 A | 9/2017 |
| CN | 107534379 A | 1/2018 |
| JP | 2000-245128 A | 9/2000 |
| JP | 2006-136051 A | 5/2006 |

(Continued)

*Primary Examiner* — Naishadh N Desai
(74) *Attorney, Agent, or Firm* — Birch, Stewart, Kolasch & Birch, LLP

(57) ABSTRACT

A linear motor is provided. The linear motor according to an embodiment of the present disclosure may comprise: a primary member including a plurality of armature modules, each armature module including a magnet core including two or more protruding portions and a coil; and a secondary member including at least one magnet module. The primary member may be fixed and a movable member composed of the secondary member moves by generated thrust. And, along the moving direction, a first interval between first armature modules disposed in a first section may be different from a second interval between second armature modules disposed in a second section after the first section.

20 Claims, 10 Drawing Sheets

(56) References Cited

FOREIGN PATENT DOCUMENTS

| | | | |
|---|---|---|---|
| JP | 2006-166537 | A | 6/2006 |
| JP | 2014-504129 | A | 2/2014 |
| JP | 2015-104200 | A | 6/2015 |
| KR | 10-2012-0068356 | A | 6/2012 |
| KR | 10-1732636 | B1 | 5/2017 |
| KR | 10-1798548 | B1 | 12/2017 |
| TW | 200828736 | A | 7/2008 |
| WO | WO 2011/024624 | A1 | 3/2011 |

\* cited by examiner

Armature Module

Primary Module

| No. of armature modules | No. of magnet poles | | | |
|---|---|---|---|---|
| 3 | 2 | 4 | 8 | 10 |
| 6 | 4 |   | 8 | 10 |
| 9 |   | 6 | 8 | 10 |
| 12 |   | 10 | 14 | 16 | ized in a moving direction and being arranged between two neighboring protruding# LINEAR MOTOR AND TRANSPORT SYSTEM USING THE SAME

CROSS REFERENCE TO RELATED APPLICATIONS

This non-provisional application claims the benefit under 35 U.S.C. § 119(a) to Patent Application No. 10-2019-0140740, filed in the Republic of Korea on Nov. 6, 2019, which is hereby expressly incorporated by reference into the present application.

BACKGROUND

Field

This disclosure relates to a transport system using a linear motor generating linear motion.

Related Art

Generally, a linear motor has a structure that generates thrust between a mover and a stator facing in a linear shape. The linear motor of a permanent magnet type places a permanent magnet on one of the mover and stator and applies alternating multi-phase power to the other, so that electromagnetic force acts between them to generate thrust in a certain direction.

As an example for a conveying system using the linear motor, the Japanese Patent Laid-Open Patent Publication 2006-166537 (P2006-166537A), "Linear motor of a movable magnet type" (hereinafter, "prior art") can be mentioned.

The linear motor according to the prior art has a structure that a rotary motor is unfolded and arranged in a straight line, and thus a strong magnetic pull is generated between a salient pole of an armature core and a permanent magnet to decrease system accuracy. And, the structure causes problems that severe wear of the guide mechanism that maintains a constant air gap occurs and a magnetic flux flows through the armature core in the same direction as the moving direction of the mover, which result a decrease in motor efficiency. In addition, in order to compensate for such a magnetic attraction force, there are many problems in that the mechanical structure is complicated and the entire equipment becomes heavy.

SUMMARY

The present disclosure has been made in view of the above circumstances. It is an object of the present disclosure to provide a transport system having a small change in running speed.

Another object of the present disclosure is to provide a permanent magnet movable transport system capable of long-distance transport while using a small number of armature modules.

In an aspect, the linear motor according to an embodiment of the present disclosure may comprise: a primary member including a plurality of armature modules, each armature module including a magnet core including two or more protruding portions and a coil which is wound around the magnet core and through which a current of a single phase flows; and a secondary member including at least one magnet module, the magnet module including a plurality of magnets poles of which are alternated in a moving direction and being arranged between two neighboring protruding portions. Power having a predetermined phase difference may be supplied to the coil of each armature module such that a thrust according to a traveling magnet field is generated by using as one unit a P number of permanent magnets that are a multiple of 2 and the armature modules arranged in a section corresponding to a first length in which the P number of permanent magnets are aligned in the moving direction. The primary member may be fixed and a movable member composed of the secondary member moves by the generated thrust. And, along the moving direction, a first interval between first armature modules disposed in a first section may be different from a second interval between second armature modules disposed in a second section after the first section.

The transport system according to another embodiment of the present disclosure may comprise: a linear motor; a ground base on which the primary member is fixed and rail is installed; a mover base to which the secondary member is fixed; and a guide mounted on the mover base and coupled to the rail.

It is possible to optimize the number of armature modules in an entire transport system and lighten the overall system configuration by arranging primary members composed of various types according to purpose.

Also, it is possible to obtain a large capacity of thrust and a fast transfer speed with a small size, and since each element is modularized, it is easy to assemble the elements and the transport system can be transformed into various forms.

In addition, it is possible to provide a conveying system using a linear motor that enables long-distance transport with a small amount of resources and a small difference between a travel speed and a target speed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Hereinafter, a transport system using a linear motor according to the present disclosure will be described in detail with reference to the accompanying drawings.

Applicant of the present disclosure has filed the application for closed-type and open-type linear motors which includes a primary member consisting of a plurality of armature modules arranged in a row in a traveling direction and a secondary member including a plurality of permanent magnet modules including a plurality of permanent magnets arranged while changing poles in the traveling direction, through application numbers KR 10-2010-0081522 and KR 10-2010-0129947.

Figure 1:
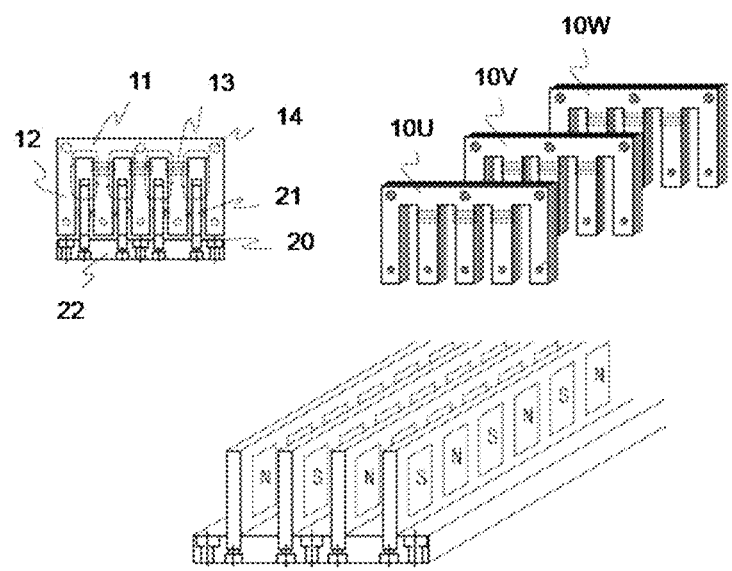
FIG. 1 is a view showing the open-type linear motor described in the application numbers KR 10-2010-0081522 and KR 10-2010-0129947 filed by the applicant of the present disclosure.

Among the linear motors described in the application numbers KR 10-2010-0081522 and KR 10-2010-0129947, in the open-type linear motor as shown in FIG. 1, the core of the armature module is not a C-shape to surround the permanent magnet module which is a secondary member, but is in a linear shape, a plurality of salient poles (or protruding poles) protrude from the core in the same direction, for example, at a right angle, and a plurality of permanent magnet modules of the secondary member also protrude toward the core between the salient poles placed side by side.

In other linear motors described in the application numbers KR 10-2010-0081522 and KR 10-2010-0129947, the protruding angles of the respective salient poles from the core of the armature module are different from each other, so it is expensive to make a mold, and there is a limit to raising the precision. However, in the linear motor of FIG. 1, the angle formed by each salient pole and the core in each armature module is the same, for example a right angle, and each permanent magnet module is also fixed at the same angle as the base, for example, at a right angle, so manufacturing precision can be increased and mold cost can be reduced.

The linear motor according to the present disclosure is a modification of the open-type linear motor of FIG. 1 into the linear moto or a permanent magnet movable type among the linear motors described in the application numbers KR 10-2010-0081522 and KR 10-2010-0129947. In the present disclosure using the permanent magnet movable linear motor, by adjusting the distance between the armature modules to correspond to the speed section required by a conveying system, long-distance conveying is possible, and the difference between the actual traveling speed and the target speed can be minimized.

Figure 2:
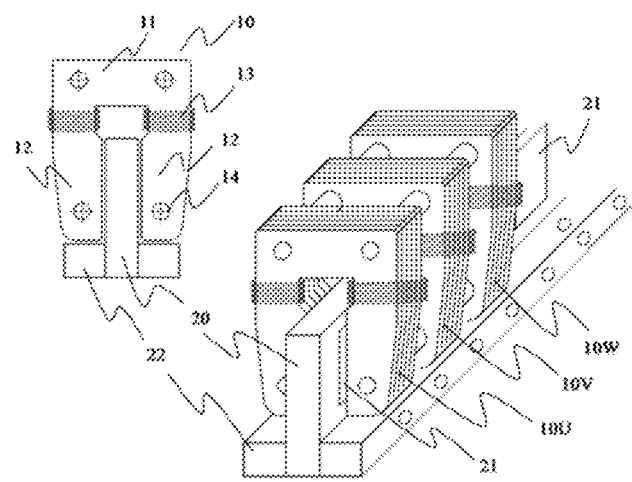
FIG. 2 shows the linear motor described in the application number KR 10-2011-0020599 filed by the applicant of the present disclosure.

FIG. 2 shows the linear motor described in the application number KR 10-2011-0020599 filed by the applicant of the present disclosure. The linear motor may include a primary member including coils generating magnetic flux and a secondary member including permanent magnets crossing the magnetic flux. Compared with the linear motor of FIG. 1, the operating principle is the same except that the number of salient poles and the number of permanent magnet modules are reduced to two and one, respectively.

Figure 3:
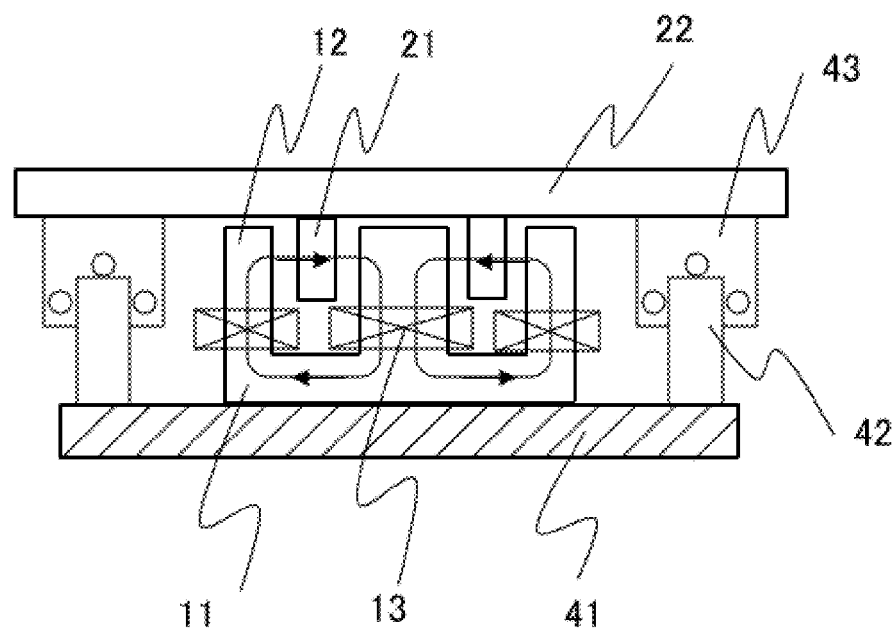
FIG. 3 is a diagram illustrating a transport system in which a primary member is fixed to a base and a movable member including permanent magnets moves according to an embodiment of the present disclosure.
Figure 3:
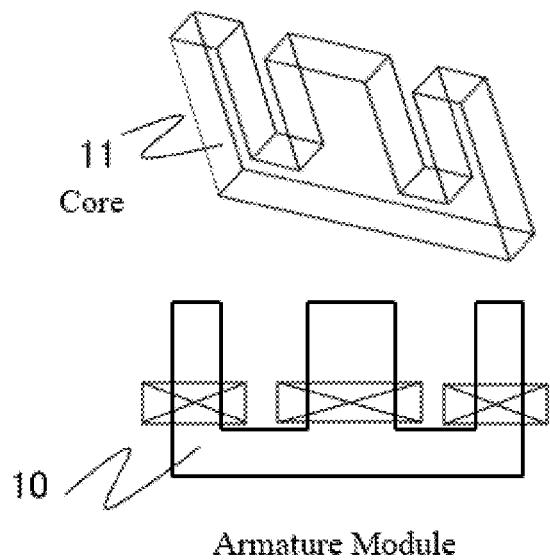
Figure 3:
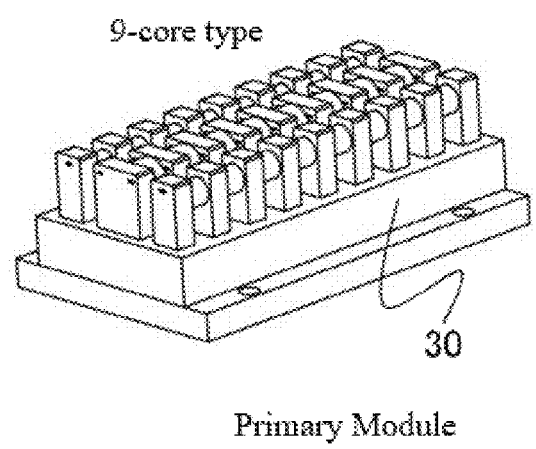

FIG. 3 is a diagram illustrating a transport system according to an embodiment of the present disclosure.

The linear motor according to the present disclosure is a permanent magnet movable type in which armature modules are fixed to a base and a mover including permanent magnets moves, and may include a primary member including coils for generating a magnetic flux and a secondary member including permanent magnets crossing the magnetic flux. Compared to the linear motors of FIGS. 1 and 2, the number of salient poles and the number of permanent magnet modules are indicated as 3 and 2 respectively, but the basic operation principle is the same.

The primary member 30 is composed of a plurality of armature modules 10 arranged in a line in a travelling direction in a separated state. Each armature module 10 is composed of a magnetic core 11, three salient poles 12 and coils 13, and the magnetic core 11 connects each salient pole 12, and a coil 13 through which a current of the same phase flows winds each of the salient poles 12. In FIG. 3, the number of salient poles 12 is three, but the present disclosure is not limited thereto, and two or more may be possible.

Since ach salient poles 12 protruding from the magnetic core 11 in the same direction is of the same material as the magnetic core 11, the magnetic core 11 and each salient pole 12 may be referred to as one magnetic core 11, and each salient pole 12 may be referred to as a protruding portion 12 of the magnetic core 11.

The secondary member is composed of permanent magnet modules 20 including a plurality of permanent magnets 21. The permanent magnet module 20 protrudes toward the core 11 of the armature module 10 and is placed between the salient poles 12, and a plurality of permanent magnets 21 are arranged while changing poles in the traveling direction of the motor. The permanent magnet module 20 may be fixed to a mover base 22. A guide rail 42 is provided on the ground base 41 for fixing the primary member, and a guide 43 is provided on the movable base 22 on which the secondary member is mounted. So, while a certain air gap is maintained between the salient pole 12 of the armature module 10 and the permanent magnet 21 of the permanent magnet module 20, the primary member and the secondary member can freely travel without mutual mechanical interference.

In each armature module 10, current is supplied to the coil 13 so that a moving magnetic field is formed in each salient pole 12. In order that advance thrust is generated by a suction force and a repulsion force formed between the electromagnetic poles formed at the end of the salient poles 12 and the corresponding permanent magnets, a current having a phase different from the phase of the current flowing through the coil 13 of the other armature module 10 may be supplied to the coil 13 of at least one armature module 10.

In each armature module 10, the polarities of the electromagnets of the salient poles 12 are different from each other so that a magnetic flux forms a closed loop, thereby a high-density magnetic flux smoothly flows between each salient pole 12 of the armature module 10 and each permanent magnet 21. To this end, for each armature module 10, the coil 13 through which a current of the same phase flows is wound around each salient pole 12, and the winding direction is set so that the polarities of the electromagnets of each salient pole 12 are different from each other.

Figure 4:
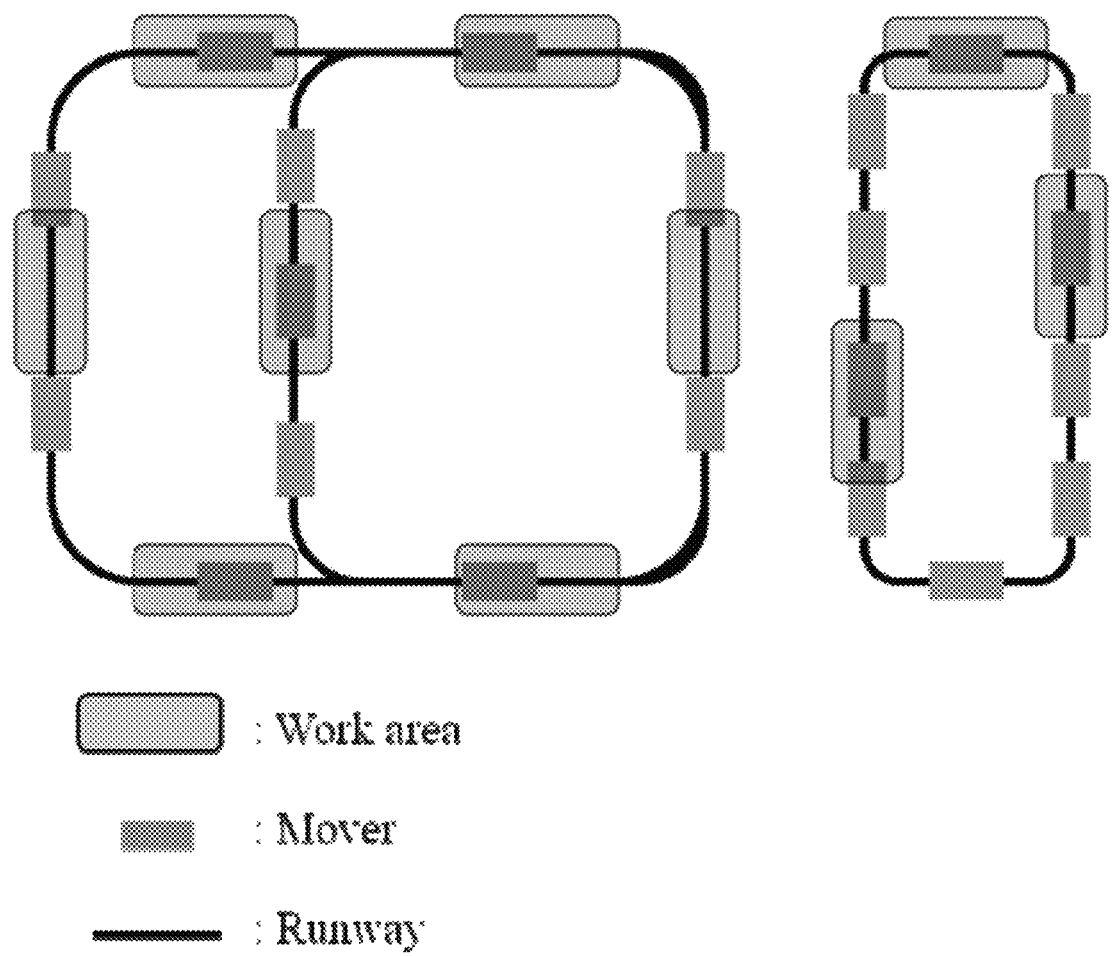
FIG. 4 is a diagram showing the configuration of a conveying system to which the linear motor according to the present disclosure is applied.

FIG. 4 is a diagram showing the configuration of a conveying system to which the linear motor according to the present disclosure is applied.

The stators of the linear motor form a runway of a closed loop through which a mover passes, and work areas are formed at a plurality of positions through which the mover passes. The mover may move at a constant speed between the work area and the work area. Alternatively, in order to increase the moving speed, it may be accelerated when the mover starts moving from a current work area to a next work area, and decelerated when it reaches the next work area. That is, it is possible to have acceleration, constant speed, and deceleration sections between the work areas.

Figure 5:
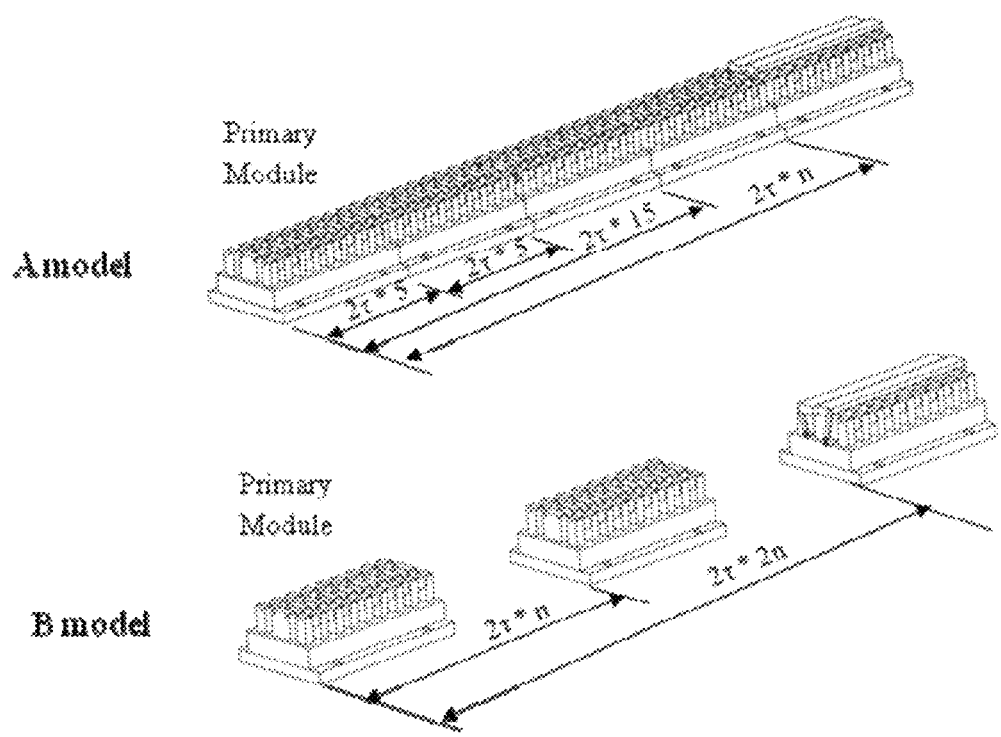
FIG. 5 shows a model A in which primary modules of a primary member are continuously arranged and a model B in which the primary modules comprised of a plurality of armature modules are intermittently arranged according to an embodiment of the present disclosure.

FIG. 5 shows a model A in which primary modules of a primary member are continuously arranged and a model B in which the primary modules comprised of a plurality of armature modules are intermittently arranged according to an embodiment of the present disclosure.

A plurality of armature modules arranged at predetermined intervals in a moving direction of the mover of the linear motor may be bundled to form one armature group (or a primary module), and a plurality of armature groups may be continuously or intermittently disposed to form a trajectory of a conveying system. When the pitch of the permanent magnets of the N and S poles of the permanent magnets is τ, the total length of one armature group is ideally an even multiple of τ, but odd multiples are possible if the absolute phase difference between each phase of the armature modules and the direction of the moving magnetic field are made to match.

At this time, when arranging each armature group, it should be arranged so that the induced electromotive force (back electromotive force) of each phase is in phase. To this end, when arranging a plurality of armature groups in the moving direction, the spacing between the first armature modules of respective armature groups (or the spacing between armature modules of the same phase) should be n times 2*τ (n is an integer of 1 or more).

Figure 6:
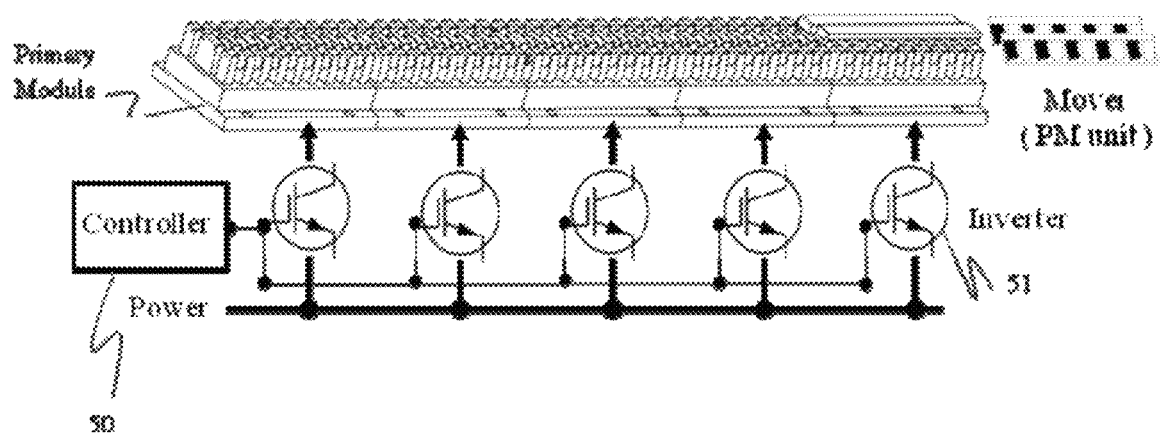
FIG. 6 is a diagram illustrating a transport system in which primary modules are arranged in succession, one inverter is connected to each primary module, and the entire inverters are controlled by a host controller according to an embodiment of the present disclosure.

FIG. 6 is a diagram illustrating a transport system in which primary modules are arranged in succession, one inverter 51 is connected to each primary module, and the entire inverters are controlled by a host controller 50 according to an embodiment of the present disclosure, In FIG. 6, each armature group has an inverter separately for driving the coils of each armature module belonging to the corresponding armature group. However, since a plurality of armature modules can be in phase with each other, it is possible to reduce the number of inverters used by connecting the terminal lines of the armature modules in series, parallel or in series-parallel.

Figures 7, 8:
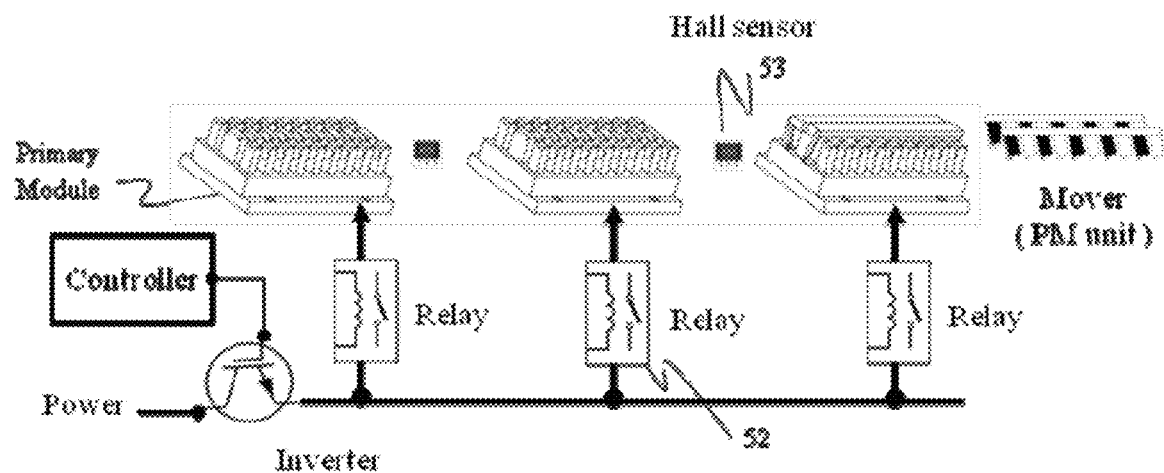
FIG. 7 is a diagram illustrating a transport system in which primary modules of a primary member are intermittently disposed, a relay is connected to each primary module, and a plurality of primary modules are controlled by a host controller with one inverter according to an embodiment of the present disclosure.
FIG. 8 shows a combination relationship between the number of armature modules and the number of permanent magnet poles of a three-phase synchronous motor.

FIG. 7 is a diagram illustrating a transport system in which primary modules of a primary member are intermittently disposed, a relay is connected to each primary module, and a plurality of primary modules are controlled by a host controller with one inverter according to an embodiment of the present disclosure. Of course, in some cases, instead of a relay, an inverter may be separately connected for each armature group.

A hall sensor 53 is arranged in the section where the primary module (or the armature group) is not arranged, and the controller 50 may determine the position of the permanent magnet mover, connect the next primary module to which the mover will move through the relay and control the corresponding primary module.

FIG. 8 shows a combination relationship between the number of armature modules and the number of permanent magnet poles of a three-phase synchronous motor.

In the table of FIG. 8, in the case that the number of permanent magnet poles is 8, 3, 6, and 9 armature modules may be used in common. Likewise, even in the case of 10 permanent magnet poles, 3, 6, and 9 armature modules may be used in common.

Figure 9:
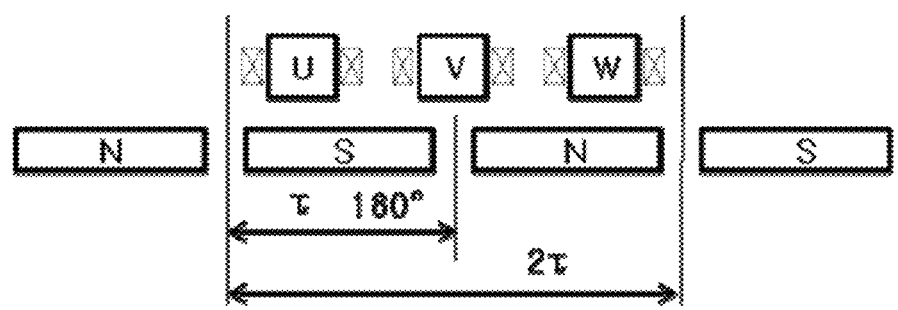
FIG. 9 shows the principle of operation in which thrust in a linear direction is generated by a combination of a primary member composed of three armature modules and a plurality of permanent magnets in a linear motor.
Figure 9:
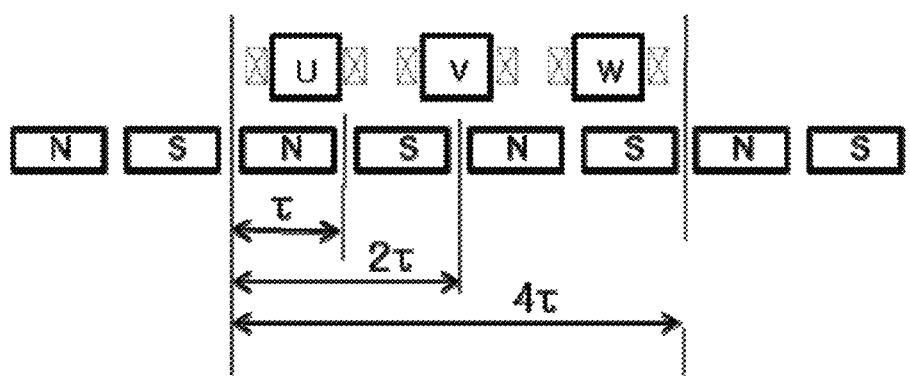

FIG. 9 shows the principle of operation in which thrust in a linear direction is generated by a combination of a primary member composed of three armature modules and a plurality of permanent magnets in a linear motor. FIG. 9 shows a principle of generating thrust in the traveling direction by a combination of two or more armature modules and permanent magnet modules. For example, when two permanent magnets 21 are matched to three armature modules (10U, 10Y, 10W), three phases of the armature modules and two poles of the permanent magnets may be a combination as shown in the upper of FIG. 9.

In FIG. 9, each of U, V, W is one salient pole 12 of the three armature modules 10U, 10Y, and 10W arranged in the moving direction, and S and N are permanent magnets 21 placed at positions corresponding to the salient poles U, V, and W.

A single-phase current is supplied to the coil 13 of each armature module 10, but in the case of three phases, a current having a phase difference of 120 degrees from neighboring modules may be applied to the coil 13 of each armature module 10.

Also, as shown in the above of FIG. 9, when the pole spacing of the permanent magnets S or N alternately arranged in the traveling direction is set to τ (½ cycle 180 degrees), the three armature modules 10 may be arranged at intervals corresponding to ⅔τ (120 degrees).

While an AC current with a peak value flows through the coil winding round the salient pole V located between the permanent magnets S and N in a positive (+) direction, and thus the salient pole V becomes an N pole, an AC current with a magnitude corresponding to peak value/square root of 2 flows through the coils winding round the salient poles U and W in a negative (−) direction, and thus the salient poles U and W become S poles. Accordingly, an attractive force is generated between the salient pole V corresponding to the N pole and the permanent magnet S and a repulsive force is generated between the salient pole V and the permanent magnet N so as to move the permanent magnets to the right. Although a repulse force and an attractive force are respectively generated between the permanent magnets S and N and the salient poles U and W that become the S poles according to a magnetic force smaller than that of the salient pole V corresponding to the N pole, the attractive force and the repulsive force are cancelled each other, and thus the salient poles U and W do not affect the movement of the permanent magnets.

The permanent magnets are moved by ⅔ pole pitch, and thus the salient pole W is located between the permanent magnets S and N. In this state, when a current of which the phase advances by 120° is flowed through the coil of each salient pole and a current with the peak value is flowed through the coil winding round the salient pole W in the positive direction, the salient pole W becomes an N pole. In addition, an AC current with the magnitude corresponding to the peak value/square root of 2 is flowed through the coils winding round the salient poles U and V in the negative direction such that the salient poles U and V become S poles. Accordingly, an attractive force is generated between the salient pole W corresponding to the N pole and the permanent magnet S and a repulsive force is generated between the salient pole W and the permanent magnet N so as to move the permanent magnets to the right. The salient poles U and W that become the S poles according to a magnetic force smaller than that of the salient pole V corresponding to the N pole respectively produce a repulsive force and an attractive force on the permanent magnets S and N. However, the attractive force and the repulsive force are cancelled each other.

The aforementioned operation is repeated to move the permanent magnets to the right. That is, the 3-phase currents applied to the armature modules generate a traveling magnetic field in the salient poles, and thus a thrust that moves the magnets to the right is generated.

In an ideal case, the thrust for moving the permanent magnets 21 is proportional to the sum of surface areas of contact portions of the salient poles 12 and the permanent magnets 21, the number of armature modules 10 arranged in the moving direction, the magnitude of current applied to the coils 13, coil turns of the coils 13 winding round the salient poles 12, and the magnitude of the magnetic force of each permanent magnet 21.

The first example of FIG. 9 shows a basic combination of 3-phase armature modules and 2-pole permanent magnets and the second example of FIG. 9 shows a combination of 3-phase armature modules and 4-pole permanent magnets. These two examples have the same fundamentals of generating a thrust. Furthermore, a combination of 3-phase armature modules and 8-pole permanent magnets is also available.

In general, a thrust is generated based on a combination of the number S of armature modules, which corresponds to a multiple of a motor constant, and the number P of permanent magnet modules, which corresponds to a multiple of 2 (N and S poles). Here, the motor constant is 3 if the armature modules are driven with 3-phase power and 5 if the armature modules are driven with 5-phase power. An odd-numbered motor constant equal to or greater than 3 is generally used and a phase difference of currents applied to the coils of each armature module is determined by the motor constant.

When the length (length in the moving direction) of a region in which the S armature modules face the P permanent magnet modules having a gap between the armature modules and the permanent magnet modules is referred to as a unit length of a primary member (or first member), an effective distance capable of generating a thrust that moves the mover can be secured only when one of the primary member composed of multiple armature modules and the secondary member composed of multiple permanent magnets is longer than the unit length.

That is, the effective distance for generating the thrust can be secured only when the length of the overlap portion of the primary member and the secondary member is longer than the unit length (when the number of the armature modules is equal to or greater than S or the number of the permanent magnet modules is equal to or greater than P), and the thrust can increase in proportion to the length of the overlap portion.

3-phase currents are applied to each armature module 10 of the primary member in the order of UuU (U-phase group), VvV (V-phase group) and WwW (W phase group) in the traveling direction. Here, small letters mean a current having a phase opposite to the phase of a current represented by capitals.

Since the primary member (ferromagnetic substance identical to the material of the core of the primary member) is composed of the independent armature modules which are not connected, independent magnetic fluxes having the same magnitude flow through the respective armature modules if the same power is supplied to the armature modules. Accordingly, there is a little deviation in thrusts generated through the armature modules so as to reduce ripples in the thrusts.

Assuming that the distribution of magnetic flux coming out of or entering the salient pole 12 is constant, the amount of magnetic flux passing through the salient pole 12 and the permanent magnet 21 is proportional to the area of a portion where the surface of the salient pole 12 and the surface of the permanent magnet 21 overlap each other.

The cross section of the permanent magnet 21 through which the magnetic flux from the salient pole 12 of the armature module 10 or the magnetic flux entering the salient pole 12 passes is not limited to a rectangle or a parallelogram, and may be a rhombus, a circle, or an ellipse, and an octagonal shape with four corners of a rectangle or parallelogram is also possible.

Figure 10:
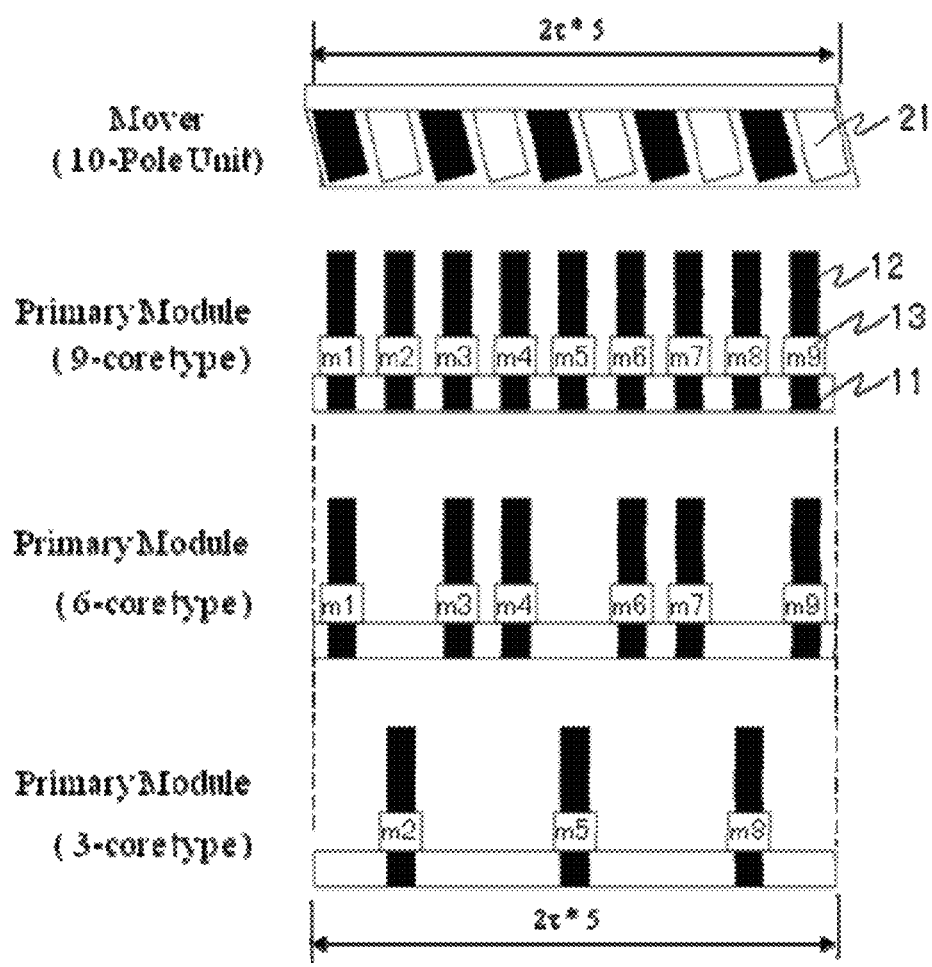
FIG. 10 shows a first armature group consisting of 9 armature modules, a second armature group consisting of 6 armature modules, and a third armature consisting of 3 armature modules for a permanent magnet unit of 10-pole type having the same structure according to an embodiment of the present disclosure.

FIG. 10 shows a first armature group consisting of 9 armature modules, a second armature group consisting of 6 armature modules, and a third armature consisting of 3 armature modules for a permanent magnet unit of 10-pole type having the same structure according to an embodiment of the present disclosure.

Each armature group may be designed to be equal to the unit length L (2τ*5=10 poles) of the secondary member composed of a permanent magnet 10-pole unit.

In the first armature group, 9 armature modules are arranged at equal intervals within the unit length L range of the secondary member. In the second armature group, 6 armature modules are arranged in a form in which 3 armature modules are omitted from the first armature group within the unit length L range of the secondary member. In the third armature group, 3 armature modules are arranged in a form in which 6 armature modules are omitted from the first armature group within the unit length L range of the secondary member.

That is, in the second armature group, the second, fifth, and eighth armature modules are removed at intervals of three armature modules from the first armature group, and only the first, third, fourth, sixth, seventh and ninth armature modules are arranged. Also, in the third armature group, only the second, fifth, and eighth armature modules remain at intervals of three armature modules from the first armature group, and the remaining armature modules are omitted. Accordingly, the ratio of the number of armature modules disposed in the first armature group, the second armature group and the third armature group is 3:2:1.

The first spacing between the armature modules in the first armature group is smaller than the third spacing between the armature modules in the third armature group. Also, the spacing between the armature modules in the second armature group is one of the first spacing and the second spacing.

In the linear motor of the present disclosure, since a separate coil is wound for each armature module and the other armature modules do not affect each other, there is no problem in operation even if several armature modules are removed from the armature group continuously arranged at the same interval.

That is, in FIG. 10, the first armature group includes 9 armature modules in the order of m1, m2, m3, m4, m5, m6, m7, m8 and m9 disposed in the unit length L of the 10-pole unit (10 permanent magnets). Currents of the U-phase group are supplied to m1, m2 and m3, those of the V-phase group are supplied to m4, m5 and m6, and those of the W-phase group are supplied to m7, m8 and m9, thereby generating thrust to move the permanent magnet module which is a secondary member.

And, the second armature group includes 6 armature modules in the order of m1, m3, m4, m6, m7, and m9 disposed in the unit length L of the 10-pole unit. Currents of the U-phase group are supplied to m1 and m3, those of the V-phase group are supplied to m4 and m6, and those of the W-phase group are supplied to m7 and m9, thereby generating thrust to move the permanent magnet module which is a secondary member.

Similarly, the third armature group includes 3 armature modules in the order of m2, m5, and m8 disposed in the unit length L of the 10-pole unit. U-phased current is supplied to m2, V-phased current is supplied to m5, and W-phased current is supplied to m8, thereby generating thrust to move the permanent magnet module which is a secondary member.

For the unit length L ($2\tau*4=8$ poles) of the secondary member composed of the permanent magnet 8-pole unit of the same structure, the first armature group composed of 9 armature modules, the second armature composed of 6 armature modules, the third armature group composed of 3 armature modules may be used in common.

Within the unit length range for generating thrust, a ratio of the number of armature modules disposed in the first armature group to the number of poles of the permanent magnets may be 9:10 or 9:8.

Figure 11:
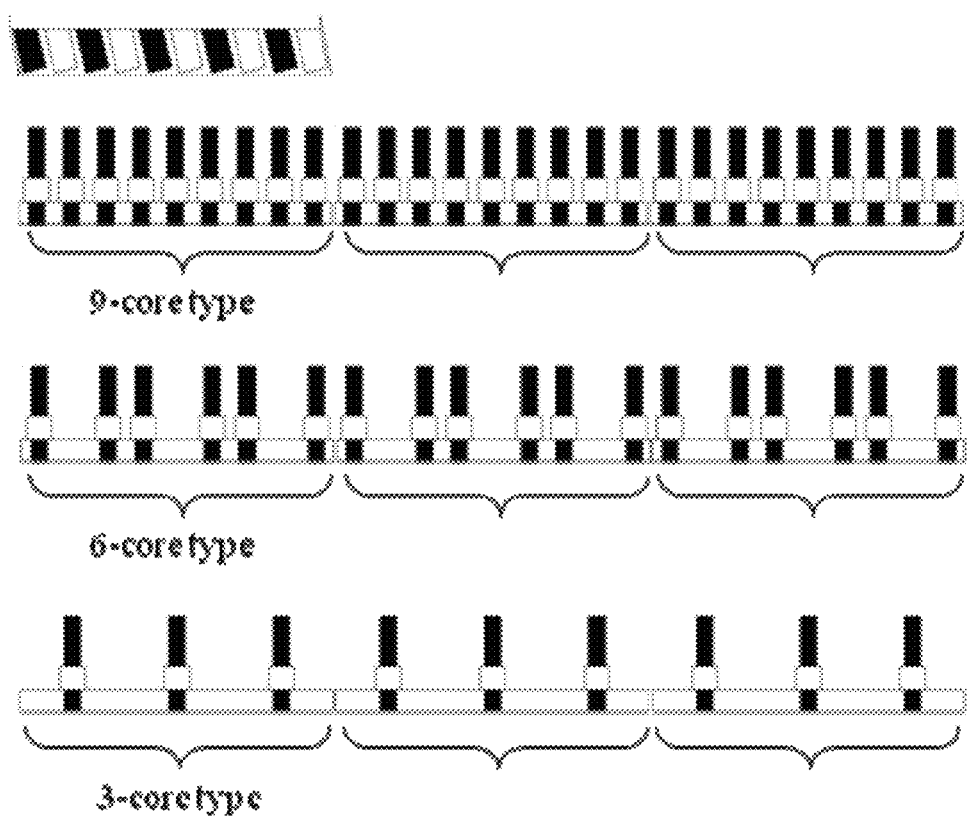
FIG. 11 shows an example in which the same armature groups are continuously arranged according to an embodiment of the present disclosure.

FIG. 11 shows an example in which the same armature groups are continuously arranged according to an embodiment of the present disclosure, and the secondary member may be used in common with any type.

When the first armature groups each consisting of nine armature modules are arranged in succession, armature modules are arranged in succession at equal intervals. When the second armature groups each consisting of six armature modules are arranged in succession, the form in which one armature module is omitted after two armature modules are successively arranged is repeated in a cycle of three armature modules. When the third armature groups each consisting of three armature modules are arranged in succession, the form in which two armature modules are successively omitted after one armature module is arranged is repeated in a cycle of three armature modules.

Figure 12:
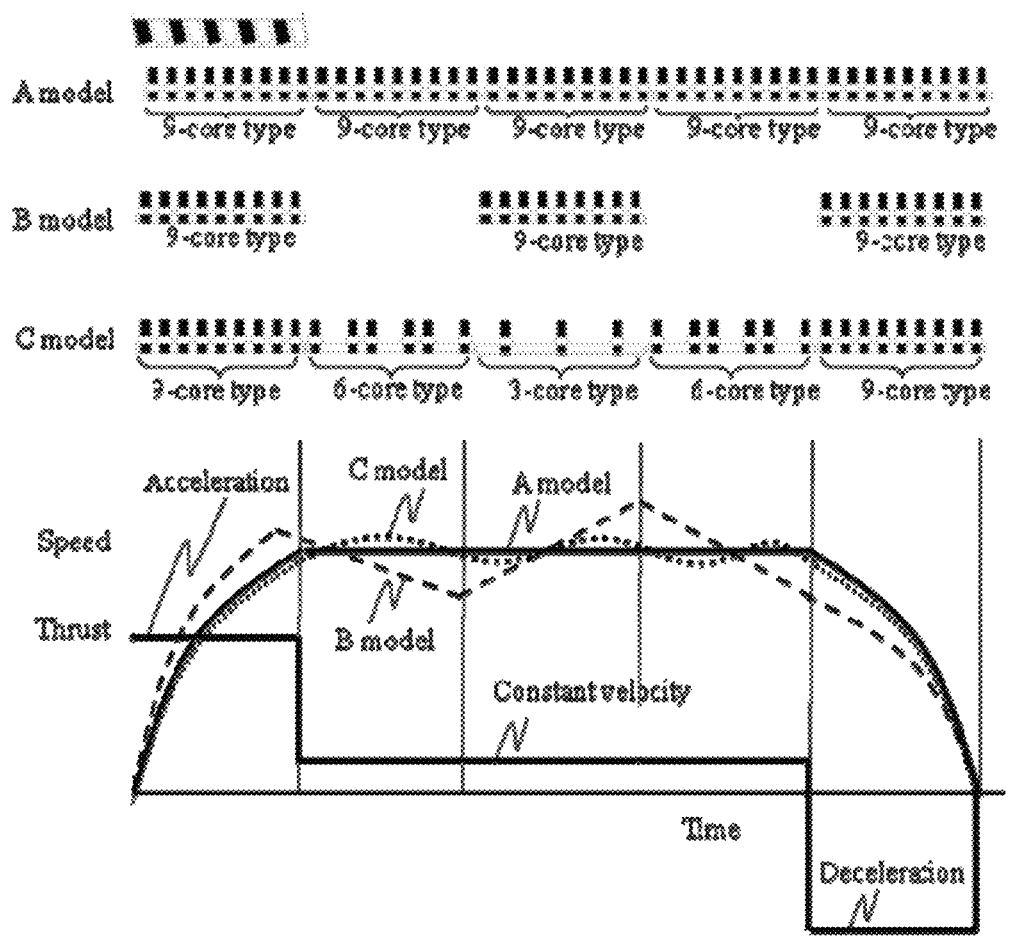
FIG. 12 shows the relative magnitude of the required thrust in respective speed sections of acceleration, constant speed, and deceleration, and the speed changes in respective speed sections for the different arrangements of the primary members according to an embodiment of the present disclosure.

FIG. 12 shows the relative magnitude of the required thrust in respective speed sections of acceleration, constant speed, and deceleration, and the speed changes in respective speed sections for the different arrangements of the primary members according to an embodiment of the present disclosure In FIG. 12, A model is a successive arrangement of first armature groups of 9 armature modules, B model is an intermittent arrangement of the first armature groups, and C model is a sequential arrangement in the order of the first armature group of 9 armature modules, the second armature group of 6 armature modules, the third armature group of 3 armature modules, the second armature group, and the first armature group.

If the conveying system uses a linear motor of A model in which the first armature groups in each of which 9 armature modules are arranged at equal intervals are arranged in succession, it is ideal because the speed change is the smallest, but the longer the moving distance, the higher the cost of the required primary member and the overall weight of the conveying system becomes heavier.

By intermittently arranging the first armature groups like B model, it is possible to reduce the cost increase of the primary member and reduce the overall weight. However, the speed change during the operation of the mover is severe, so there are restrictions on use depending on the application.

As shown in the below graph of FIG. 12, the path starting from the first position until reaching the second position and stopping may be composed of an acceleration section, a constant velocity section, and a deceleration section. For each section, required thrust varies depending on the speed type of the section. In the acceleration section a relatively large amount of thrust for acceleration is required, in the constant velocity section almost no thrust is required, and in the deceleration section a relatively large amount of thrust is required in the opposite direction. In other words, the relative magnitude of the required thrust varies depending on the speed required for the section.

In the below graph of FIG. 12, the graph of A model corresponds to the ideal speed of the linear motor over time. However, in the graph of B model, overshoot and undershoot occur in the acceleration section, constant velocity section, and deceleration section, causing the mover to rattle when decelerating and accelerating.

Accordingly, in the acceleration section and the deceleration section, the first armature group may be disposed in which the armature modules are arranged at equal intervals with no armature module being omitted so as to generate a large amount of thrust. Since thrust is hardly required in the constant velocity section, the third armature group having the longest distance between the armature modules may be disposed. And the second armature group may be disposed between the acceleration section and the constant velocity section, and between the constant velocity section and the deceleration section.

That is, in the present disclosure, by continuously arranging the armature groups having different intervals between armature modules according to the speed required (or thrust necessary) in the sections, resources can be efficiently used, cost increase and weight can be reduced and errors from target speed can be decreased.

In FIG. 12, the primary member is arranged in the order of the first armature group→the second armature group→the third armature group→the second armature group→the first armature group. However, the primary member may be arranged in the order of the first armature group→the third armature group→the first armature group while deleting the second armature groups or in the order of the first armature group→the second armature group→the first armature group while deleting the third armature groups.

Figure 13:
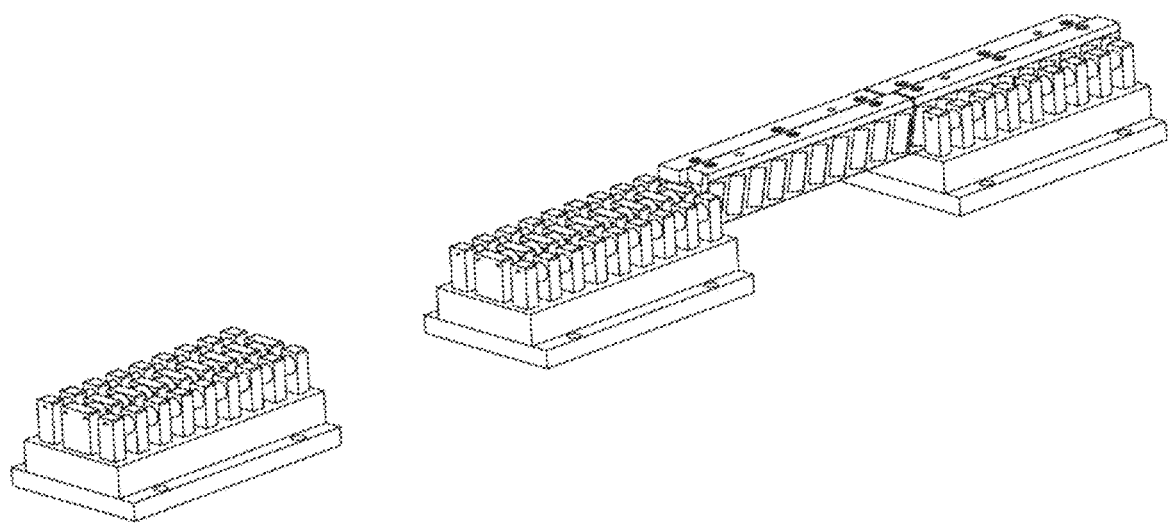
FIG. 13 shows an embodiment of reducing a speed error by increasing the length of the mover when the B Model of FIG. 12 is adopted as the primary member.

FIG. 13 shows an embodiment of reducing a speed error by increasing the length of the mover when the B Model of FIG. 12 is adopted as the primary member The below graph in FIG. 12 is simulated under the assumption that the length of the armature group and the length of the permanent magnet module are the same. In the case of B model, there may be more speed errors because thrust does not occur between two neighboring armature groups.

When the first armature groups consisting of 9 armature modules are intermittently arranged as shown in B model of FIG. 12, the length of the permanent magnet module, which is the secondary member, may be made longer than the length of the first armature group so that parts of both ends of the secondary member overlap two first armature groups as shown in FIG. 13 even when the center of the secondary member passes between adjacent two first armature groups. For example, by configuring the secondary member as a permanent magnet 20 pole unit, the difference from a target speed may be reduced.

Figure 14:
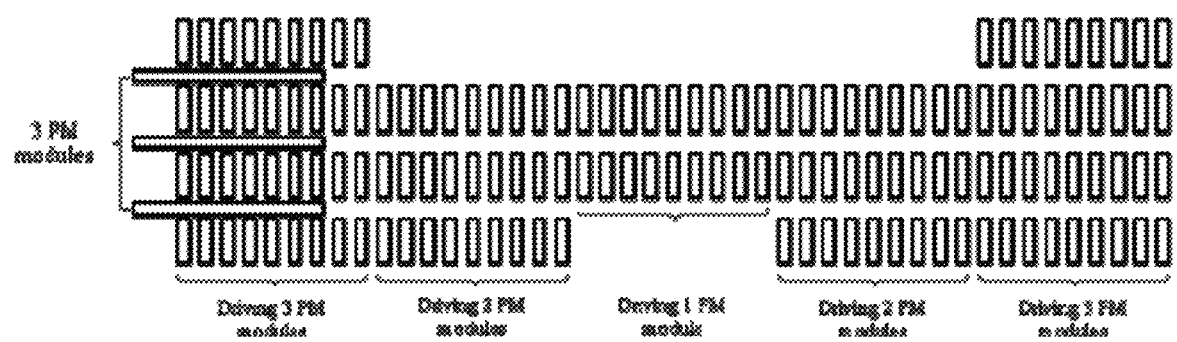
FIG. 14 is a diagram illustrating the arrangement of the primary member in which armature modules with different numbers of salient poles are arranged for each speed section according to another embodiment of the present disclosure.

FIG. 14 is a diagram illustrating the arrangement of the primary member in which armature modules with different numbers of salient poles are arranged for each speed section according to another embodiment of the present disclosure.

The linear motor of the present disclosure is characterized in that it is possible to freely select and design the number of permanent magnet modules disposed in a direction perpendicular to a traveling direction. There are four permanent magnet modules 20 in FIG. 1, one permanent magnet module 20 in FIG. 2, and two permanent magnet modules 20 in FIG. 3. Even if three permanent magnet modules 20 are used, it is possible to configure a linear motor with the same principle.

As shown in FIG. 14, in the acceleration section and the deceleration section requiring a large thrust, armature modules consisting of four salient poles are arranged as a part of the primary member so as to drive all three permanent magnet modules. In the section where intermediate thrust is required, armature modules consisting of three salient poles are arranged as a part of the primary member so as to drive two permanent magnet modules. In the section where small thrust is required, armature modules consisting of two salient poles are arranged as a part of the primary member so as to drive only one permanent magnet module.

FIG. 14 shows an example of changing the number of salient poles of the armature module for each section to control the number of permanent magnet modules that can be driven. By combining the embodiment of FIG. 14 with C model of FIG. 12, not only the number of permanent magnet modules that can be driven, but also the number of armature modules included in the section corresponding to the length of the permanent magnet module (or the distance between the armature modules) may be adjusted differently.

By configuring the primary modules constituting the primary member into various types and arranging them continuously to match the speed or thrust, it is possible to minimize the speed change while reducing the cost increase of the primary member, and to reduce the overall weight of the conveying system.

In the conveying system using the linear motor of the present disclosure, since the primary member and the secondary member do not have unnecessary mechanical interference in any section other than the guide portion for guiding travel, the durability is good and the product life is long.

The following briefly and clearly describes various embodiments of the linear motor and conveying system of the present disclosure.

The linear motor according to an embodiment of the present disclosure may comprise: a primary member including a plurality of armature modules, each armature module including a magnet core including two or more protruding portions and a coil which is wound around the magnet core and through which a current of a single phase flows; and a secondary member including at least one magnet module, the magnet module including a plurality of magnets poles of which are alternated in a moving direction and being arranged between two neighboring protruding portions. Power having a predetermined phase difference may be supplied to the coil of each armature module such that a thrust according to a traveling magnet field is generated by using as one unit a P number of permanent magnets that are a multiple of 2 and the armature modules arranged in a section corresponding to a first length in which the P number of permanent magnets are aligned in the moving direction. The primary member may be fixed and a movable member composed of the secondary member moves by the generated thrust. And, along the moving direction, a first interval between first armature modules disposed in a first section may be different from a second interval between second armature modules disposed in a second section after the first section.

In an embodiment, a third interval between third armature modules disposed in a third section after the second section may be same as the first interval.

In an embodiment, the second interval may be larger than the first interval.

In an embodiment, the first section and the third section may be sections in which speed of the movable member is changed, and the second section may be a section in which speed of the movable member is constant.

In an embodiment, a fourth section and a fifth section may be respectively disposed between the first section and the second section and between the second section and the third section, and an interval between the fourth armature modules disposed in the fourth and fifth sections may be one of the first interval and the second interval.

In an embodiment, a ratio of a number of first armature modules disposed in a section corresponding to the first length in the first section, a number of the fourth armature modules disposed in a section corresponding to the first length in the fourth section, and a number of the second armature modules disposed in a section corresponding to the first length in the second section may be 3:2:1.

In an embodiment, 9 first armature modules may be arranged in an order of 1-1m, 1-2m, 1-3m, 1-4m, 1-5m, 1-6m, 1-7m, 1-8m and 1-9m in a section corresponding to the first length in the first section, currents of U-phase group may be supplied to the 1-1m, the 1-2m and the 1-3m, currents of V-phase group may be supplied to the 1-4m, the 1-5m and the 1-6m, and currents of W-phase group may be supplied to the 1-7m, the 1-8m and the 1-9m. 6 fourth armature modules may be arranged in an order of 4-1m, 4-3m, 4-4m, 4-6m, 4-7m and 4-9m in a section corresponding to the first length in the fourth section, the currents of the U-phase group may be supplied to the 4-1m and the 4-3m, the currents of the V-phase group may be supplied to the 4-4m and the 4-6m, and the currents of the W-phase group may be supplied to the 4-7m and the 4-9m. 3 second armature modules may be arranged in an order of 2-2m, 2-5m and 2-8m in a section corresponding to the first length in the second section, a current of phase U may be supplied to the 2-2m, a current of phase V may be supplied to the 2-5m, and a current of phase W may be supplied to the 2-8m.

In an embodiment, relationship between a number M of the first armature modules disposed in a section corresponding to the first length in the first section and the P may be M:P=9:(9±1).

In an embodiment, a first number of the protruding portions included in the magnetic core of the first armature modules and a second number of the protruding portions included in the magnetic core of the second armature modules may be different from each other.

In an embodiment, a third number of the protruding portions included in the magnetic core of third armature modules disposed in the third section after the second section may be equal to the first number and greater than the second number.

The transport system according to another embodiment of the present disclosure may comprise: the above-described linear motor; a ground base on which the primary member is fixed and rail is installed; a mover base to which the secondary member is fixed; and a guide mounted on the mover base and coupled to the rail.

Throughout the description, it should be understood by those skilled in the art that various changes and modifications are possible without departing from the technical principles of the present disclosure. Therefore, the technical scope of the present disclosure is not limited to the detailed descriptions in this specification but should be defined by the scope of the appended claims.

What is claimed is:

1. A linear motor, comprising:
a primary member including a plurality of armature modules, each armature module including a magnet core including two or more protruding portions and a coil which is wound around the magnet core and through which a current of a single phase flows; and
a secondary member including at least one magnet module, the magnet module including a plurality of magnets poles of which are alternated in a moving direction and being arranged between two neighboring protruding portions,
wherein power having a predetermined phase difference is supplied to the coil of each armature module such that a thrust according to a traveling magnet field is generated by using as one unit a P number of permanent magnets that are a multiple of 2 and the armature modules arranged in a section corresponding to a first length in which the P number of permanent magnets are aligned in the moving direction,
wherein the primary member is fixed and a movable member composed of the secondary member moves by the generated thrust, and
wherein, along the moving direction, a first interval between first armature modules disposed in a first section is different from a second interval between second armature modules disposed in a second section after the first section.

2. The linear motor of claim 1, wherein a third interval between third armature modules disposed in a third section after the second section is same as the first interval.

3. The linear motor of claim 2, wherein the second interval is larger than the first interval.

4. The linear motor of claim 2, wherein the first section and the third section are sections in which speed of the movable member is changed, and the second section is a section in which speed of the movable member is constant.

5. The linear motor of claim 2, wherein a fourth section and a fifth section are respectively disposed between the first section and the second section and between the second section and the third section, and an interval between fourth armature modules disposed in the fourth and fifth sections is one of the first interval and the second interval.

6. The linear motor of claim 2, wherein a ratio of a number of the first armature modules disposed in a section corresponding to the first length in the first section, a number of fourth armature modules disposed in a section corresponding to the first length in a fourth section, and a number of the second armature modules disposed in a section corresponding to the first length in the second section is 3:2:1.

7. The linear motor of claim 5, wherein 9 first armature modules are arranged in an order of 1-1m, 1-2m, 1-3m, 1-4m, 1-5m, 1-6m, 1-7m, 1-8m and 1-9m in a section corresponding to the first length in the first section, currents of U-phase group are supplied to the 1-1m, the 1-2m and the 1-3m, currents of V-phase group are supplied to the 1-4m, the 1-5m and the 1-6m, and currents of W-phase group are supplied to the 1-7m, the 1-8m and the 1-9m,
wherein 6 fourth armature modules are arranged in an order of 4-1m, 4-3m, 4-4m, 4-6m, 4-7m and 4-9m in a section corresponding to the first length in the fourth section, the currents of the U-phase group are supplied to the 4-1m and the 4-3m, the currents of the V-phase group are supplied to the 4-4m and the 4-6m, and the currents of the W-phase group are supplied to the 4-7m and the 4-9m, and
wherein 3 second armature modules are arranged in an order of 2-2m, 2-5m and 2-8m in a section corresponding to the first length in the second section, a current of phase U is supplied to the 2-2m, a current of phase V is supplied to the 2-5m, and a current of phase W is supplied to the 2-8m.

8. The linear motor of claim 1, wherein a relationship between a number M of the first armature modules disposed in a section corresponding to the first length in the first section and the P is M:P=9:(9±1).

9. The linear motor of claim 1, wherein a first number of the protruding portions included in the magnetic core of the first armature modules and a second number of the protruding portions included in the magnetic core of the second armature modules are different from each other.

10. The linear motor of claim 9, wherein a third number of the protruding portions included in the magnetic core of third armature modules disposed in the third section after the second section is equal to the first number and greater than the second number.

11. A transport system, comprising:
a linear motor of claim 1;
a ground base on which the primary member is fixed and a rail is installed;
a mover base to which the secondary member is fixed; and
a guide mounted on the mover base and coupled to the rail.

12. A transport system, comprising:
a linear motor of claim 2;
a ground base on which the primary member is fixed and a rail is installed;
a mover base to which the secondary member is fixed; and
a guide mounted on the mover base and coupled to the rail.

13. A transport system, comprising:
a linear motor of claim 3;
a ground base on which the primary member is fixed and a rail is installed;

a mover base to which the secondary member is fixed; and
a guide mounted on the mover base and coupled to the rail.

14. A transport system, comprising:
a linear motor of claim 4;
a ground base on which the primary member is fixed and a rail is installed;
a mover base to which the secondary member is fixed; and
a guide mounted on the mover base and coupled to the rail.

15. A transport system, comprising:
a linear motor of claim 5;
a ground base on which the primary member is fixed and a rail is installed;
a mover base to which the secondary member is fixed; and
a guide mounted on the mover base and coupled to the rail.

16. A transport system, comprising:
a linear motor of claim 6;
a ground base on which the primary member is fixed and a rail is installed;
a mover base to which the secondary member is fixed; and
a guide mounted on the mover base and coupled to the rail.

17. A transport system, comprising:
a linear motor of claim 7;
a ground base on which the primary member is fixed and a rail is installed;
a mover base to which the secondary member is fixed; and
a guide mounted on the mover base and coupled to the rail.

18. A transport system, comprising:
a linear motor of claim 8;
a ground base on which the primary member is fixed and a rail is installed;
a mover base to which the secondary member is fixed; and
a guide mounted on the mover base and coupled to the rail.

19. A transport system, comprising:
a linear motor of claim 9;
a ground base on which the primary member is fixed and a rail is installed;
a mover base to which the secondary member is fixed; and
a guide mounted on the mover base and coupled to the rail.

20. A transport system, comprising:
a linear motor of claim 10;
a ground base on which the primary member is fixed and a rail is installed;
a mover base to which the secondary member is fixed; and
a guide mounted on the mover base and coupled to the rail.

* * * * *